United States Patent
Shen et al.

(10) Patent No.: US 11,641,295 B1
(45) Date of Patent: May 2, 2023

(54) METHOD AND DEVICE FOR ESTIMATING CARRIER FREQUENCY OFFSET, AND COMPUTER READABLE STORAGE MEDIUM

(71) Applicant: SHANGHAI EASTSOFT MICROELECTRONICS CO., LTD., Shanghai (CN)

(72) Inventors: Liwei Shen, Shanghai (CN); Guangsheng Chen, Shanghai (CN); Song Pan, Shanghai (CN)

(73) Assignee: SHANGHAI EASTSOFT MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/543,906

(22) Filed: Dec. 7, 2021

(30) Foreign Application Priority Data

Oct. 9, 2021 (CN) .......................... 202111176482.2

(51) Int. Cl.
*H04L 27/00* (2006.01)
*H04L 27/14* (2006.01)

(52) U.S. Cl.
CPC .......... *H04L 27/0014* (2013.01); *H04L 27/14* (2013.01); *H04L 2027/0028* (2013.01)

(58) Field of Classification Search
CPC ................. H04L 27/0014; H04L 27/14; H04L 2027/0028
See application file for complete search history.

(56) References Cited

U.S. PATENT DOCUMENTS

| | | | |
|---|---|---|---|
| 6,862,262 B1* | 3/2005 | Imamura | H04L 27/0014 370/208 |
| 10,700,901 B1* | 6/2020 | Torrini | H04L 27/0014 |
| 2007/0189195 A1* | 8/2007 | Belotserkovsky | H03L 7/0807 375/238 |
| 2009/0079656 A1* | 3/2009 | Peyla | H01Q 1/46 343/860 |
| 2009/0190686 A1* | 7/2009 | Cheong | H04B 7/0684 375/267 |
| 2012/0155890 A1* | 6/2012 | Zhou | H04B 10/6165 398/208 |
| 2019/0109749 A1* | 4/2019 | Bai | H04L 1/0086 |
| 2022/0294538 A1* | 9/2022 | Harley | H04B 10/6165 |

* cited by examiner

*Primary Examiner* — Janice N Tieu
(74) *Attorney, Agent, or Firm* — Boyle Frederickson S.C.

(57) ABSTRACT

A method and device for estimating a carrier frequency offset, and a computer-readable storage medium are provided. The method includes: determining a target area where a phase discrimination signal is located, wherein the target area is one of N numbers of candidate areas, the N numbers of candidate areas correspond to different value ranges, an union range of the N numbers of candidate areas is $[\pi, -\pi]$, and $N \geq 2$; determining a first estimation value of a direct current component corresponding to the phase discrimination signal based on the target area; and performing a carrier frequency offset compensation on the phase discrimination signal based on the first estimation value of the direct current component.

8 Claims, 5 Drawing Sheets

Figure 9

METHOD AND DEVICE FOR ESTIMATING CARRIER FREQUENCY OFFSET, AND COMPUTER READABLE STORAGE MEDIUM

CROSS-REFERENCE TO RELATED APPLICATIONS

This application claims the benefit of priority to Chinese Patent Application No. 202111176482.2, filed on Oct. 9, 2021, and entitled "METHOD AND DEVICE FOR ESTIMATING CARRIER FREQUENCY OFFSET ESTIMATION, AND COMPUTER-READABLE STORAGE MEDIUM", the entire disclosure of which is incorporated herein by reference.

TECHNICAL FIELD

The present disclosure generally relates to communication technology field, and more particularly, to a method and device for estimating a carrier frequency offset, and a computer-readable storage medium.

BACKGROUND OF THE INVENTION

Generally, a frequency-Shifting Keying (FSK) utilizes a change of a carrier frequency to transmit effective digital signals. A spectral spreading is usually caused by a phase discontinuity which occurs when a symbol hops between 0 and 1. For avoiding the spectral spreading, and for further reducing a bandwidth of a communication signal, a Gauss Frequency-Shifting Keying (GFSK) is often used as a normal modulation method.

Out of low-cost and low-power needs, a non-coherent demodulation method is often used to demodulate a GFSK signal or a FSK signal. The non-coherent demodulation method includes a direct phase detection, a cross-correlation detection and a differential detection. Wherein, the direct phase detection is of good performance among above-mentioned non-coherent demodulation methods.

A carrier frequency offset is often caused by a frequency difference of crystal oscillators between a transmitter and a receiver. A direct current component may be introduced in an output signal of a non-coherent demodulation by a carrier frequency offset. For a direct phase detection, the direct current component is obtained by $2\pi\Delta f\tau$, wherein $\Delta f$ represents a carrier frequency offset, and $\tau$ represent a sampling interval for calculating a phase difference. Therefore, before a demodulation decision, it is necessary to perform a carrier frequency offset estimation and compensation on an output signal obtained by the direct phase detection.

For the direct phase detection, the carrier frequency offset estimation means to calculate the direct current component within the phase discrimination signal; and the carrier frequency offset compensation means to reduce a direct current component in a phase discrimination signal. The method for estimating a carrier frequency offset may include: an extreme value method, an averaging method, a low-pass filtering method and so on.

However, when the carrier frequency offset is large, the phase discrimination signal may overflow (when the phase is greater than $\pi$ or less than $-\pi$). In this situation, the existing method for estimating a carrier frequency offset cannot calculate the carrier frequency offset correctly, which may lead to a failure in demodulation by the receiver.

SUMMARY OF THE INVENTION

Embodiments of the present disclosure provide a method and a device for calculating a carrier frequency offset when a phase discrimination signal overflows.

In an embodiment of the present disclosure, a method for estimating a carrier frequency offset is provided, the method includes: determining a target area where a phase discrimination signal is located, wherein the target area is one of N numbers of candidate areas, the N numbers of candidate areas correspond to different value ranges, and an union range of the N numbers of candidate areas is $[\pi, -\pi]$, wherein N≥2; determining a first estimation value of a direct current component corresponding to the phase discrimination signal based on the target area; and performing a carrier frequency offset compensation on the phase discrimination signal based on the first estimation value of the direct current component.

In some embodiment, said determining the target area where the phase discrimination signal is located includes: determining a number of sampling points of the phase discrimination signal falling within each candidate area; and determining a candidate area with a largest number of points as the target area.

In some embodiment, said determining the target area where the phase discrimination signal is located includes: quantifying the phase discrimination signal; and determining a target area where a quantized phase discrimination signal is located.

In some embodiment, said determining the first estimation value of the direct current component corresponding to the phase discrimination signal based on the target area includes: obtaining a central value of the target area; and determining the central value as the first estimation value.

In some embodiment, after performing the carrier frequency offset compensation on the phase discrimination signal, further includes: performing an accurate estimation and compensation on the signal after the carrier frequency offset compensation.

In some embodiment, said performing the accurate estimation and compensation on the signal after the carrier frequency offset compensation includes any one of the following: performing the accurate estimation and compensation on the signal after the carrier frequency offset compensation by an extreme value method; performing the accurate estimation and compensation on the signal after the carrier frequency offset compensation by an averaging method; and performing the accurate estimation and compensation on the signal after the carrier frequency offset compensation by a low-pass filtering method.

In an embodiment of the present disclosure, a computer-readable storage medium having computer instructions stored therein is a non-volatile storage medium or a non-transitory storage medium, wherein once the computer instructions are executed by a processor, cause the processor to: determine a target area where a phase discrimination signal is located, wherein the target area is one of N numbers of candidate areas, the N numbers of candidate areas correspond to different value ranges, and an union range of the N numbers of candidate areas is $[\pi, -\pi]$, wherein N≥2; determine a first estimation value of a direct current component corresponding to the phase discrimination signal based on the target area; and perform a carrier frequency offset compensation on the phase discrimination signal based on the first estimation value of the direct current component.

In an embodiment of the present disclosure, a device for estimating a carrier frequency offset includes a memory and a processor, wherein the memory has computer instructions stored therein, once the processor executes the computer instructions, cause the processor to: determine a target area where a phase discrimination signal is located, wherein the target area is one of N numbers of candidate areas, the N numbers of candidate areas correspond to different value ranges, and an union range of the N numbers of candidate areas is [π, −π], wherein N≥2; determine a first estimation value of a direct current component corresponding to the phase discrimination signal based on the target area; and perform a carrier frequency offset compensation on the phase discrimination signal based on the first estimation value of the direct current component.

Embodiments of the present disclosure may have following advantages.

In an embodiment of the present disclosure, a target area where a phase discrimination signal is located is determined, wherein the target area is one candidate area among [π, −π], and a first estimation value of a direct current component corresponding to the phase discrimination signal is determined based on the target area. In the process of determining the first estimation value of the direct current component, whether the phase discrimination signal overflows or not does not affect the first estimation value of the direct current component, such that a carrier frequency offset can be estimated accurately.

Further, a carrier frequency offset compensation is performed on the phase discrimination signal based on the first estimation value of the direct current component, which can ensure a receiver to demodulate normally.

In addition, after the carrier frequency offset compensation is performed on the phase discrimination signal with the first estimation value, estimating and compensating the offset-compensated signal may further improve an estimation accuracy of the direct current component.

DETAILED DESCRIPTION OF THE INVENTION

Figure 1:
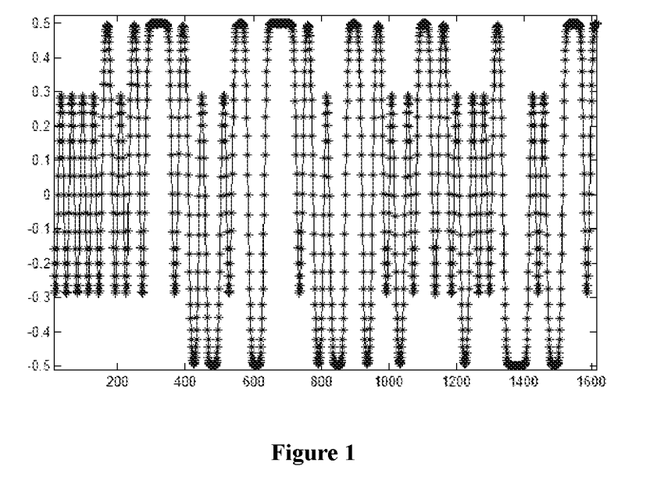
FIG. 1 schematically illustrates a signal waveform diagram obtained by an existing direct phase detection.

With reference to FIG. 1, a signal waveform diagram obtained by an existing direct phase detection is provided. In FIG. 1, a horizontal coordinate represents a number of sampling points, a longitudinal coordinate represents a phase difference, and a unit for the longitudinal coordinate is π. It can be known from FIG. 1 that if a modulation frequency is positive, the phase difference is positive; and if the modulation frequency is negative, the phase difference is negative. The signal shown in FIG. 1 is an ideal signal without direct current component.

Figure 2:
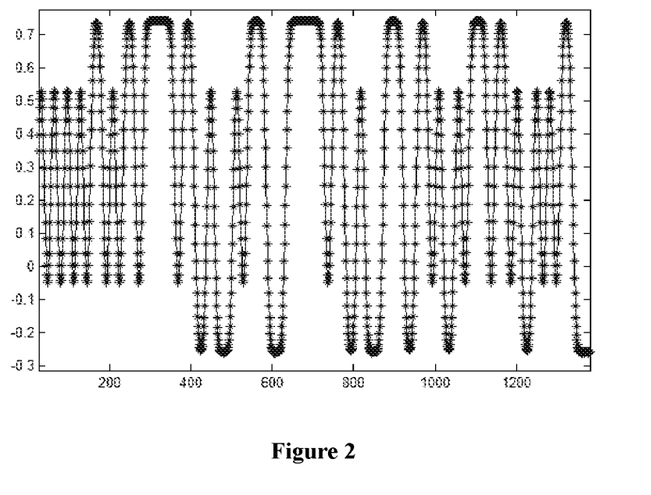
FIG. 2 schematically illustrates a signal waveform diagram obtained by another existing direct phase detection.

With reference to FIG. 2, a signal waveform diagram obtained by another existing direct phase detection is provided. In FIG. 2, a direct current component is presented in the direct phase discrimination signal. Thus, before a demodulation decision, a carrier frequency offset estimation and compensation may be performed on the direct phase discrimination signal.

Figure 3:
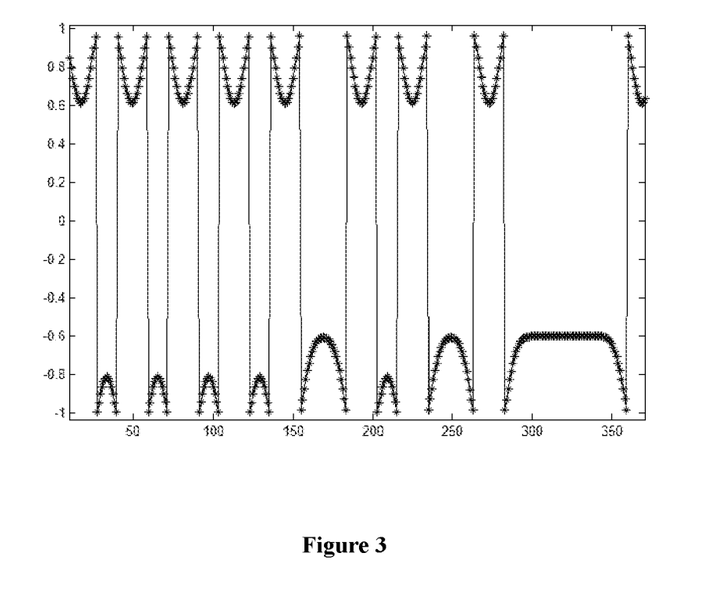
FIG. 3 schematically illustrates a signal waveform diagram of an existing output result overflowing.

However, when a carrier frequency offset is large, a resulted phase discrimination including a direct current component and a frequency offset value may overflow, as shown in FIG. 3. A diagram of an overflowing signal waveform of an existing output result is provided in FIG. 3. Existing methods for estimating a carrier frequency offset have an estimation range, when a carrier frequency offset is large, the existing methods cannot calculate the carrier frequency offset correctly, which may lead to a failure in demodulation by a receiver.

In embodiments of the present disclosure, in the process of determining the first estimation value of a direct current component corresponding to the phase discrimination signal, whether the phase discrimination signal overflows or not does not affect the first estimation value of the direct current component, such that a carrier frequency offset can be estimated accurately.

In order to clarify the object, characteristic and advantages of embodiments of the present disclosure, embodiments of present disclosure will be described clearly in detail in conjunction with accompanying drawings.

Figure 4:
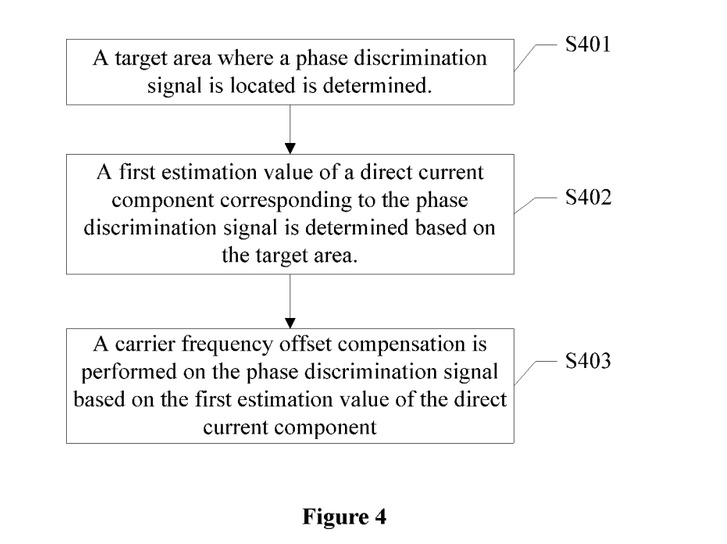
FIG. 4 schematically illustrates a flowchart of a method for estimating a carrier frequency offset according to an embodiment of the present disclosure.

In an embodiment of the present disclosure, a method for estimating a carrier frequency offset is provided. Referring to FIG. 4, a detailed description is provided in combination with specific S401, S402 and S403.

In S401, a target area where a phase discrimination signal is located is determined.

In a specific implementation, a data output by a phase discriminator can be obtained and determined as a phase discrimination signal, and a target area where the phase discrimination signal is located can be determined.

In an embodiment of the present disclosure, N numbers of candidate areas is set in a range of [π, −π] in advance, wherein N≥2. After receiving the phase discrimination signal, numbers of sampling points of the phase discrimination signals falling within each candidate area can be determined, and a candidate area with a largest number of points is determined as a target area where the phase discrimination signal is located.

In an embodiment of the present disclosure, among N numbers of candidate areas, different candidate areas correspond to different value ranges. The value ranges corresponding to different candidate areas may or may not overlap.

For example, the number of candidate areas is 4, the value range corresponding to area 1 is [0, π/2], the value range corresponding to area 2 is [π/2, π], the value range corresponding to area 3 is [0, −π/2], and the value range corresponding to area 4 is [−π/2, −π].

Figure 5:
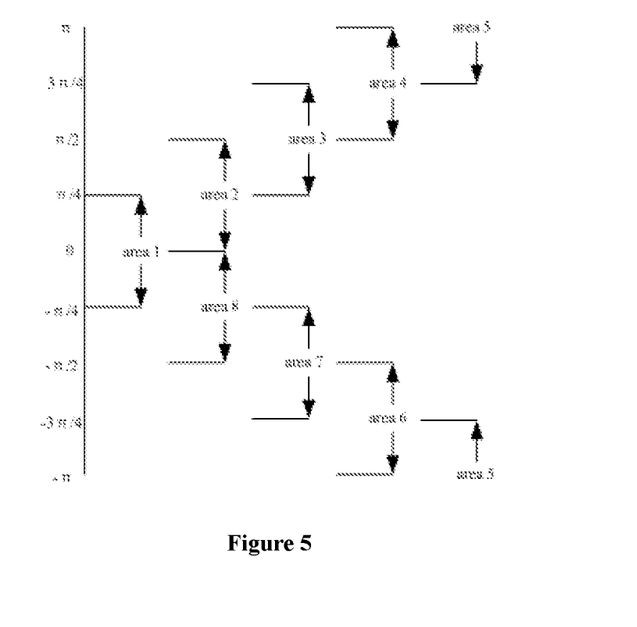
FIG. 5 schematically illustrates a diagram of a division of candidate areas according to an embodiment of the present disclosure.

For another example, referring to FIG. 5, a schematic diagram of a division of candidate areas according to an embodiment of the present disclosure is provided.

In an embodiment of the present disclosure, an area of [−π, π] is divided into 8 areas. Each area has a length of π/2, and there is an overlapping range of π/4 between adjacent areas. A value range corresponding to area 1 is [−π/4, π/4], a value range corresponding to area 2 is [0, π/2], a value range corresponding to area 3 is [π/4, 3π/4], a value range corresponding to area 4 is [π/2, π], a value range corresponding to area 5 is [3π/4, −3π/4], a value range corresponding to area 6 is [−π, −π/2], a value range corresponding to area 7 is [−3π/4, −π/4], and a value range corresponding to area 8 is [−π/2, 0].

With reference to FIG. 5, if the phase discrimination signal includes 128 numbers of sampling data, and most of the 128 numbers of sampling points falls within candidate area 2, candidate area 2 can be determined to be as a target area corresponding to the phase discrimination signal.

In an embodiment of the present disclosure, an overlapping exists between each two adjacent areas, and part of sampling points of a phase discrimination signal may fall in the overlapping area between the two adjacent candidate areas. In this case, the two adjacent candidate areas can both determine the sampling points falling in the overlapping area as sampling points corresponding to themselves. Thus, a sum of a number of sampling points determined by each candidate area may be greater than a corresponding number of the phase discrimination signal. By setting an overlapping area between each two adjacent areas, an accuracy of determining a target area can be improved.

In an embodiment of the present disclosure, after determining a phase discrimination signal, the phase discrimination signal can be quantified, and a target area where the quantized phase discrimination signal is located can be determined.

In S402, a first estimation value of a direct current component corresponding to the phase discrimination signal is determined based on the target area.

In a specific implementation, after determining the target area corresponding to the phase discrimination signal, the central value of the target area can be determined as a first estimation value of a direct current component corresponding to the phase discrimination signal.

With reference to FIG. 5, for example, area 1 is determined as the target area corresponding to the phase discrimination signal, and the central value corresponding to area 1 is 0. Then, the direct current component corresponding to the obtained phase discrimination signal is 0.

For another example, area 2 is obtained as the target area corresponding to the phase discrimination signal, and the central value corresponding to area 2 is π/4. Then, it is determined that the direct current component corresponding to the obtained signal output by the phase discrimination is π/4.

By determining the central value of a target area as the first estimation value of the direct current component corresponding to the phase discrimination signal, a corresponding error falls within a range of a difference between a maximum value and the central value corresponding to the target area. As shown in the above example, if the target area is area 2, an obtained error of a direct current component is not greater than π/4 (that is, π/2-π/4).

In an embodiment of the present disclosure, the value of N is not limited to above examples. The larger the value of N, the greater the number of candidate areas determined by dividing an area [π, −π], and the smaller the error of the direct current component obtained. Correspondingly, a computational complexity increases.

On the contrary, the smaller the value of N, the fewer the number of candidate areas determined by dividing an area [π, −π], and the greater the error of the direct current component obtained. Correspondingly, the computational complexity decreases.

Therefore, to determine the value of N, an error of a direct current component and a computational complexity should be both taken into account in a specific application.

Continuing to referring to FIG. 3 together with FIG. 5, according to a method for estimating a carrier frequency offset in embodiments of the present disclosure, it can be determined that sampling points of the phase discrimination signal fall within the range of area 5. Thus, it can be determined that the first direct current component is π (or −π).

It can be seen that, in an embodiment of the present disclosure, in a process of determining the first estimation value of the direct current component corresponding to the phase discrimination signal, whether the phase discrimination signal overflows or not does not affect the first estimation value of the direct current component, such that a carrier frequency offset can be estimated accurately.

In S403, a carrier frequency offset compensation is performed on the phase discrimination signal based on the first estimation value of the direct current component.

In a specific implementation, after determining the first estimation value of the direct current component corresponding to the phase discrimination signal, the first estimation value of the direct current component can be used to perform a carrier frequency offset compensation on the phase discrimination signal.

In an embodiment of the present disclosure, the phase discrimination signal can be delayed, and the first estimation value of the direct current component obtained can be subtracted from the delayed phase discrimination data to perform the carrier frequency offset compensation on the phase discrimination signal.

Figure 6:
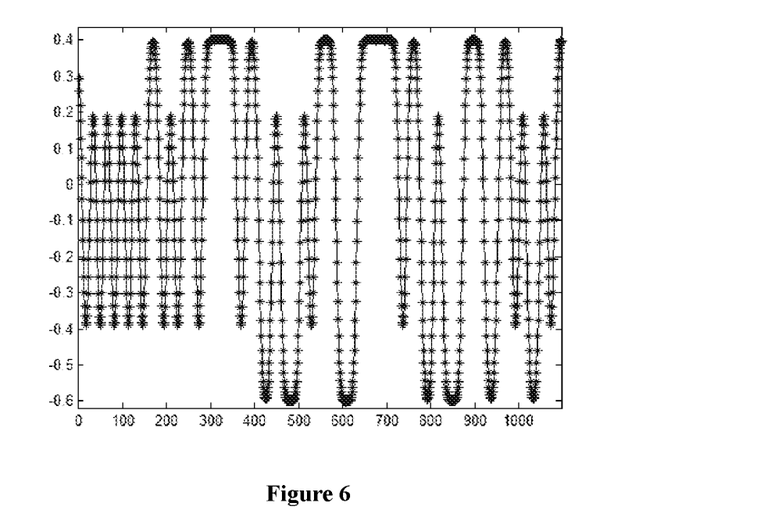
FIG. 6 schematically illustrates a schematic diagram of signal after a carrier frequency offset compensation according to an embodiment of the present disclosure.

Referring to FIG. 6, a schematic diagram of a signal after the carrier frequency offset compensation according to an embodiment of the present disclosure is provided. Comparing FIG. 6 with FIG. 2, it can be known that, in FIG. 6, after the carrier frequency offset compensation, although there is still a direct current component in the phase discrimination signal, compared with FIG. 2, the corresponding direct current component in FIG. 6 is smaller.

Figure 7:
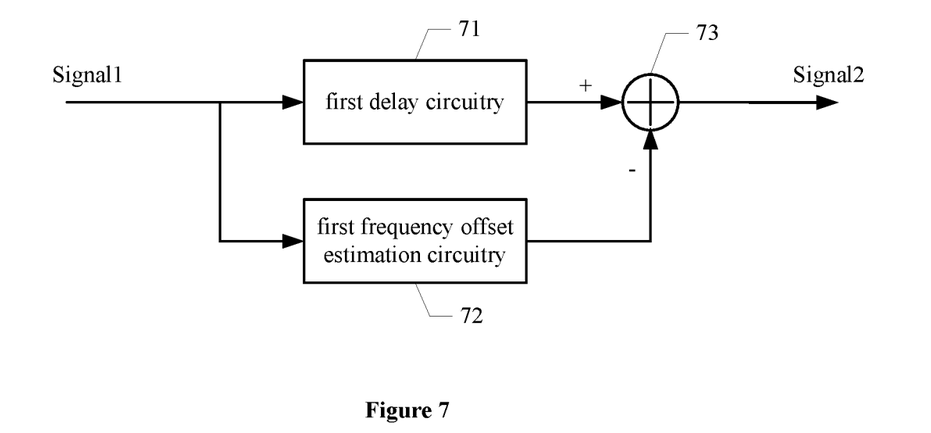
FIG. 7 schematically illustrates a diagram of a carrier frequency offset estimation and compensation according to an embodiment of the present disclosure.

Referring to FIG. 7, a schematic diagram of circuit structure of a carrier frequency offset estimation and compensation according to an embodiment of the present disclosure is provided. In FIG. 7, a first frequency offset estimation circuitry 72 may be a hardware circuit which can implement the method for estimating the carrier frequency offset according to the present disclosure. The hardware circuit may include a processor and a memory, and the hardware circuit can execute the method for estimating the carrier frequency offset based on above embodiments.

In FIG. 7, a phase discrimination signal Signal1 can be respectively input to a first delay circuitry 71 and the first frequency offset estimation circuitry 72, an output of first delay circuitry 71 and the output of first frequency offset estimation circuitry 72 are subtracted by a first adder 73 to obtain a phase discrimination signal Signal2 after the frequency offset compensation.

In an embodiment of the present disclosure, after the carrier frequency offset compensation is performed on a phase discrimination signal based on a first estimation of a direct current component, an accurate estimation and compensation can be performed on the signal after the carrier frequency offset compensation.

When performing the accurate estimation and compensation on the signal after the carrier frequency offset compensation, an extreme value method can be used to accurately estimate and compensate the first estimation of the direct current component; an averaging method can also be used to accurately estimate and compensate the signal after the carrier frequency offset compensation; and a low-pass filtering method can also be used to accurately estimate and compensate the signal after the carrier frequency offset compensation.

In an embodiment of the present disclosure, the method for accurately estimating and compensating the signal after the carrier frequency offset compensation can be determined according to a requirement of a receiver.

In an embodiment of the present disclosure, if a receiver requires a high speed of a frequency offset convergence, an extreme value method can be used to accurately estimate and compensate the signal after the carrier frequency offset compensation; if the receiver requires a higher-precision estimation value, an averaging method can be used to accurately estimate and compensate the signal after the carrier frequency offset compensation; and if the receiver requires to track a change of the carrier frequency offset for a long time, a low-pass filtering method can be used to accurately estimate and compensate the signal after a carrier frequency offset compensation.

In an embodiment of the present disclosure, the signal after the carrier frequency offset compensation can be delayed, and any one of above methods of accurate estimation can be used to accurately estimate the signal after the carrier frequency offset compensation. And the signal that has been accurately estimated and compensated can be obtained by subtracting two signals obtained through above-mentioned processes, that is, a final phase discrimination signal.

Figure 8:
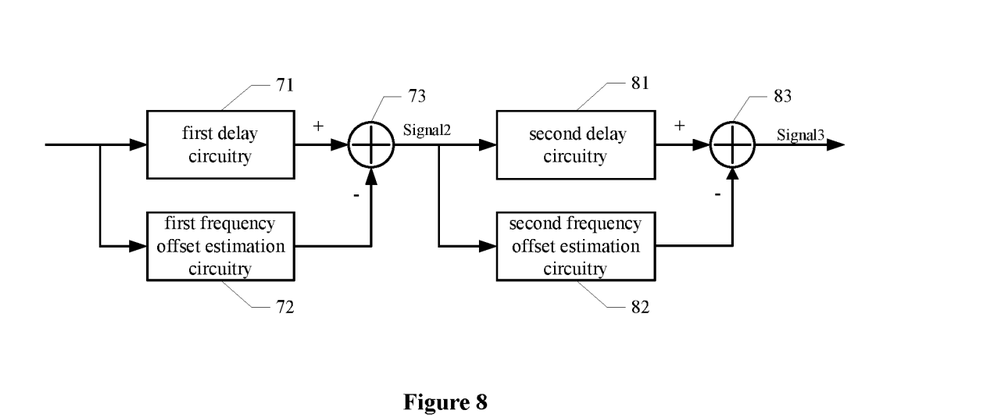
FIG. 8 schematically illustrates a diagram of a carrier frequency offset estimation and compensation according to another embodiment of the present disclosure.

Referring to FIG. 8, a schematic diagram of circuit structure of a carrier frequency offset estimation and compensation according to another embodiment of the present disclosure is provided.

In an embodiment of the present disclosure, a phase discrimination signal Signal 2 after the carrier frequency offset compensation can be respectively input to a second delay circuitry 81 and a second frequency offset estimation circuitry 82, any one of an extreme value method, an averaging method and a low-pass filtering method can be used by the second frequency offset estimation circuitry 82 to perform the accurate estimation and compensation on its input signal. An output of the second delay circuitry 81 and an output of the second frequency offset estimation circuitry 82 are subtracted by a second adder 83 to obtain an accurately estimated and compensated signal Signal3.

It can be seen that after performing the carrier frequency offset compensation on the phase discrimination signal, the accurate estimation and compensation may be performed on the signal after the carrier frequency offset compensation, which may further improve an estimation accuracy of the direct current component.

Figure 9:
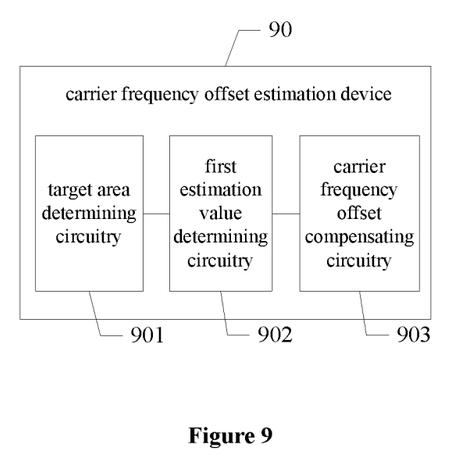
FIG. 9 schematically illustrates a structural diagram of a device for estimating a carrier frequency offset.

Referring to FIG. 9, a device 90 for estimating a carrier frequency offset is provided, the device may include: a target area determining circuitry 901, a first estimation value determining circuitry 902 and a carrier frequency offset compensating circuitry 903.

The target area determining circuitry 901 is adapted to determine a target area where a phase discrimination signal is located; wherein the target area is one of N numbers of candidate areas, an union range of the N numbers of candidate areas is [π, −π], and N≥2;

The first estimation value determining circuitry 902 is adapted to determine a first estimation value of a direct current component corresponding to the phase discrimination signal based on the target area; and A carrier frequency offset compensating circuitry 903 is adapted to perform a carrier frequency offset compensation on the phase discrimination signal based on the first estimation value of the direct current component.

In a specific implementation, specific execution processes of the target area determining circuitry 901, the first estimation value determining circuitry 902, and the carrier frequency offset compensating circuitry 903 may refer to above S401 to S403, which are not described in detail in embodiments of the present disclosure.

In an embodiment of the present disclosure, a computer-readable storage medium having computer instructions stored therein is provided, the computer-readable storage medium is a non-volatile storage medium or a non-transitory storage medium, wherein once the computer instructions are executed, the method for estimating a carrier frequency offset based on above embodiments is performed.

In an embodiment of the present disclosure, a device for estimating a carrier frequency offset comprising a memory and a processor is provided, wherein the memory has computer instructions stored therein, and the method for estimating a carrier frequency offset based on above embodiments is performed, on the basis that the processor executes the computer instructions.

Those skilled in the art can understand that all or part of processes of various methods in above embodiments can be completed by a program instructing relevant hardware. The program can be stored in a computer-readable storage medium, and the storage medium may include: ROM, RAM, magnetic disk or optical disk, etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for estimating a carrier frequency offset, comprising:
   determining a target area where a phase discrimination signal is located, wherein the target area is one of N numbers of candidate areas, the N numbers of candidate areas correspond to different value ranges, and an union range of the N numbers of candidate areas is [π, −π], wherein N≥2;
   determining a first estimation value of a direct current component corresponding to the phase discrimination signal based on the target area; and
   performing a carrier frequency offset compensation on the phase discrimination signal based on the first estimation value of the direct current component.

2. The method according to claim 1, wherein said determining the target area where the phase discrimination signal is located comprises:
   determining a number of sampling points of the phase discrimination signal falling within each candidate area; and
   determining a candidate area with a largest number of points as the target area.

3. The method according to claim 2, wherein said determining the target area where the phase discrimination signal is located comprises:
quantifying the phase discrimination signal; and
determining a target area where a quantized phase discrimination signal is located.

4. The method according to claim 1, wherein said determining the first estimation value of the direct current component corresponding to the phase discrimination signal based on the target area comprises:
obtaining a central value of the target area; and
determining the central value as the first estimation value.

5. The method according to claim 1, wherein after performing the carrier frequency offset compensation on the phase discrimination signal, further comprising:
performing an accurate estimation and compensation on the signal after the carrier frequency offset compensation.

6. The method according to claim 5, wherein said performing the accurate estimation and compensation on the signal after the carrier frequency offset compensation comprises any one of the following:
performing the accurate estimation and compensation on the signal after the carrier frequency offset compensation by an extreme value method;
performing the accurate estimation and compensation on the signal after the carrier frequency offset compensation by an averaging method; and
performing the accurate estimation and compensation on the signal after the carrier frequency offset compensation by a low-pass filtering method.

7. A computer-readable storage medium having computer instructions stored therein, the computer-readable storage medium is a non-volatile storage medium or a non-transitory storage medium, wherein once the computer instructions are executed by a processor, cause the processor to:
determine a target area where a phase discrimination signal is located, wherein the target area is one of N numbers of candidate areas, the N numbers of candidate areas correspond to different value ranges, and an union range of the N numbers of candidate areas is [$\pi$, $-\pi$], wherein N≥2;
determine a first estimation value of a direct current component corresponding to the phase discrimination signal based on the target area; and
perform a carrier frequency offset compensation on the phase discrimination signal based on the first estimation value of the direct current component.

8. A device for estimating a carrier frequency offset comprising a memory and a processor, wherein the memory has computer instructions stored therein, once the processor executes the computer instructions, cause the processor to:
determine a target area where a phase discrimination signal is located, wherein the target area is one of N numbers of candidate areas, the N numbers of candidate areas correspond to different value ranges, and an union range of the N numbers of candidate areas is [$\pi$, $-\pi$], wherein N≥2;
determine a first estimation value of a direct current component corresponding to the phase discrimination signal based on the target area; and
perform a carrier frequency offset compensation on the phase discrimination signal based on the first estimation value of the direct current component.

* * * * *